United States Patent
Cragun et al.

(10) Patent No.: US 8,037,038 B2
(45) Date of Patent: *Oct. 11, 2011

(54) CONTROLLING REUSE OF COMPONENTS IN A CONTENT MANAGEMENT SYSTEM

(75) Inventors: Brian John Cragun, Rochester, MN (US); John Edward Petri, Lewiston, MN (US); Leah Rae Smutzer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 493 days.

This patent is subject to a terminal disclaimer.

(21) Appl. No.: 12/101,262

(22) Filed: Apr. 11, 2008

(65) Prior Publication Data
US 2009/0259662 A1    Oct. 15, 2009

(51) Int. Cl.
*G06F 7/00* (2006.01)
*G06F 17/00* (2006.01)
(52) U.S. Cl. .................................................. 707/694
(58) Field of Classification Search ........... 707/999.009, 707/694
See application file for complete search history.

(56) References Cited

U.S. PATENT DOCUMENTS

| | | | |
|---|---|---|---|
| 6,513,039 B1 | 1/2003 | Kraenzel | |
| 7,779,347 B2 | 8/2010 | Christiansen et al. | |
| 2002/0163917 A1 | 11/2002 | Chen et al. | |
| 2004/0249943 A1* | 12/2004 | Punaganti Venkata et al. | 709/225 |
| 2006/0117391 A1* | 6/2006 | Kim | 726/27 |
| 2007/0143855 A1* | 6/2007 | Gilchrist et al. | 726/26 |
| 2007/0198532 A1* | 8/2007 | Krikorian et al. | 707/10 |
| 2007/0234335 A1 | 10/2007 | Takahashi et al. | |
| 2009/0259661 A1 | 10/2009 | Cragun et al. | |

* cited by examiner

*Primary Examiner* — Mohammad Ali
*Assistant Examiner* — Alexey Shmatov
(74) *Attorney, Agent, or Firm* — Martin & Associates, LLC; Derek P. Martin

(57) ABSTRACT

A content management system (CMS) includes a content reuse mechanism that checks a reuse contract corresponding to a component in the repository, and determines if all relevant criteria in the reuse contract corresponding to the component are satisfied before allowing reuse of a component in the repository. In this manner the reuse of components is controlled in a way that allows reuse when stated criteria in the reuse contract are satisfied yet restricts reuse when the criteria in the reuse contract are not satisfied.

13 Claims, 6 Drawing Sheets

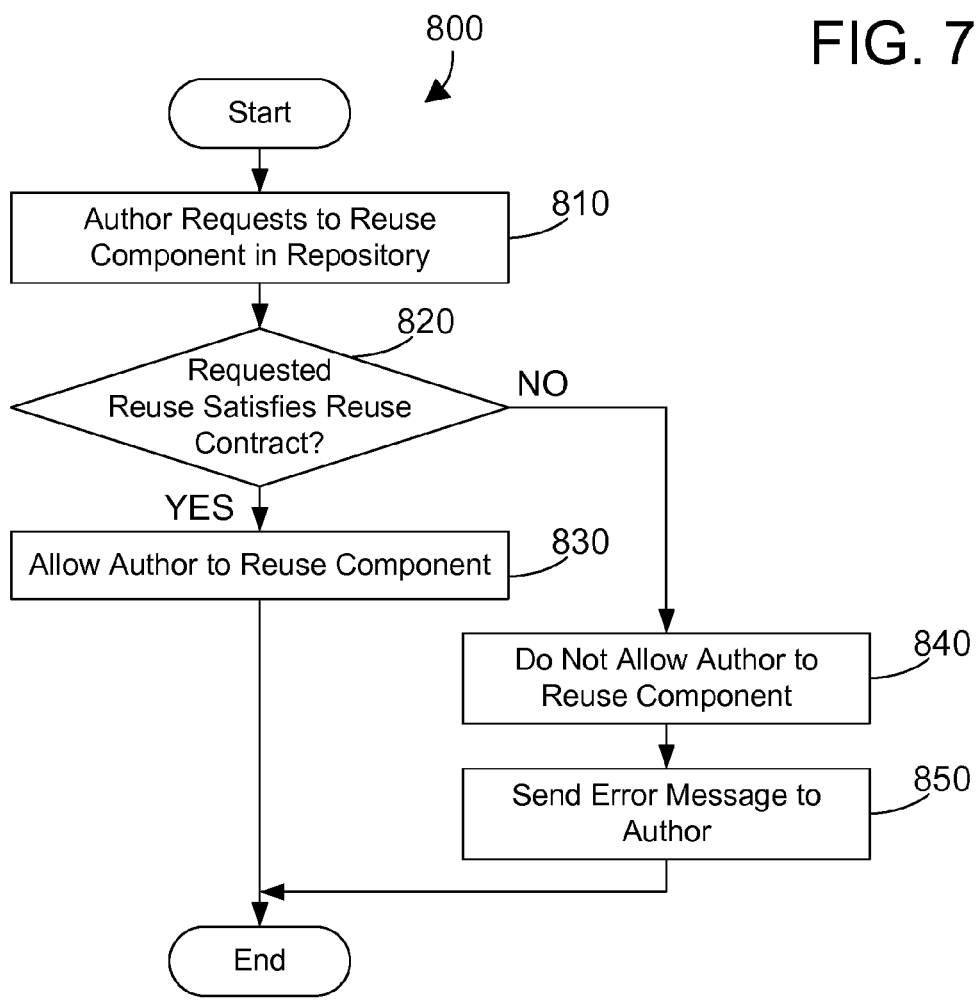

CONTROLLING REUSE OF COMPONENTS IN A CONTENT MANAGEMENT SYSTEM

BACKGROUND

1. Technical Field

This disclosure generally relates to content management systems, and more specifically relates to reuse of components in a content management system.

2. Background Art

Content management systems (CMSs) have been developed and allow many users to efficiently share electronic content such as text, audio files, video files, pictures, graphics, etc. Content management systems typically control access to content in a repository. An author (or user) may generate content, and when the content is checked into the repository, the content may be available for reuse by other users. A user may also check out content from the repository, or link to content in the repository while generating content.

It may be undesirable to allow free reuse of all components in a content management system. If a user spends a significant amount of time and effort in generating a component, the user may want to charge other users or customers for reuse of that component. In addition, the author may desire to condition reuse on satisfying various criteria. Without a way to control reuse of content in a content management system, known content management systems will not provide the needed flexibility in reusing components.

BRIEF SUMMARY

A content management system (CMS) includes a content reuse mechanism that checks a reuse contract corresponding to a component in the repository, and determines if one or more criteria in the reuse contract are satisfied before allowing reuse of the component. The content reuse mechanism may include an author feedback mechanism and a cost analysis tool. The author feedback mechanism can provide messages to an author when the author attempts to reuse a component in the repository. The cost analysis tool estimates the cost of reusing a component, and notifies an author who wants to reuse the component of the cost for the author's approval. The content reuse mechanism determines if all relevant criteria in a reuse contract for a component have been satisfied before allowing reuse of the component. In this way the reuse of components is controlled in a way that allows reuse when specified criteria are met and restricts reuse when the specified criteria are not met.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a block diagram showing sample contextual criteria that could be specified in a reuse contract;

FIG. 8 is a flow diagram of a method for controlling reuse of content in a content management system;

DETAILED DESCRIPTION

A content reuse mechanism in a content management system controls reuse of content in the repository by specifying one or more reuse contracts that correspond to one or more corresponding components in the content management system. Each reuse contract specifies one or more reuse criteria that must be satisfied for the component to be reused. When an author attempts to reuse a component, the reuse contract corresponding to the component is checked, and the author is allowed to reuse the component only if the criteria specified in the reuse contract are satisfied. In this manner, the content management system may effectively control reuse of components in its repository. Note that the term "author" as used in the disclosure and claims herein includes any person who may need to reuse a component, whether the person is someone who generates content, or an assembler or content provider that doesn't necessarily generate content themselves, but finds, coordinates, and links in components that were generated by others.

Figure 1:
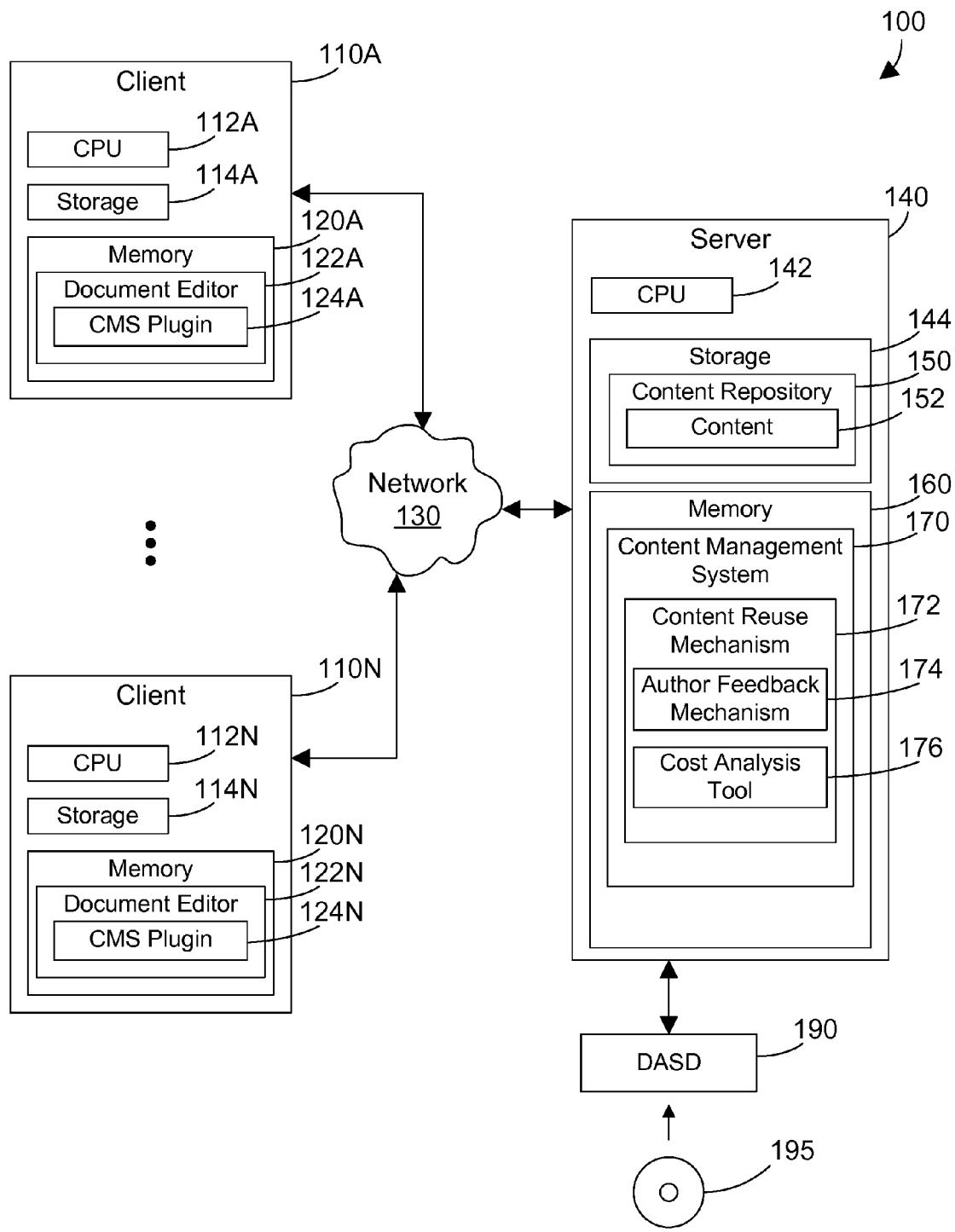
FIG. 1 is a block diagram of a networked computer system that includes a server computer system that has a content management system that includes a content reuse mechanism that controls reuse of components in a repository.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142. Computer system 140 includes storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a content reuse mechanism 172 that controls the reuse of components in the content repository 150. Content reuse mechanism 172 includes an author feedback mechanism 174 and a cost analysis tool 176. The author feedback mechanism 174 provides messages to an author who attempts to reuse a component in the repository. The cost analysis tool 176 determines from the reuse contract for a component a cost associated with reusing the component, and may notify the author via the author feedback mechanism 174 for approval of the cost before reuse is allowed.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as storage 144, main memory 160, and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The content management system may also be delivered as part of a service engagement with a client corporation, non-profit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
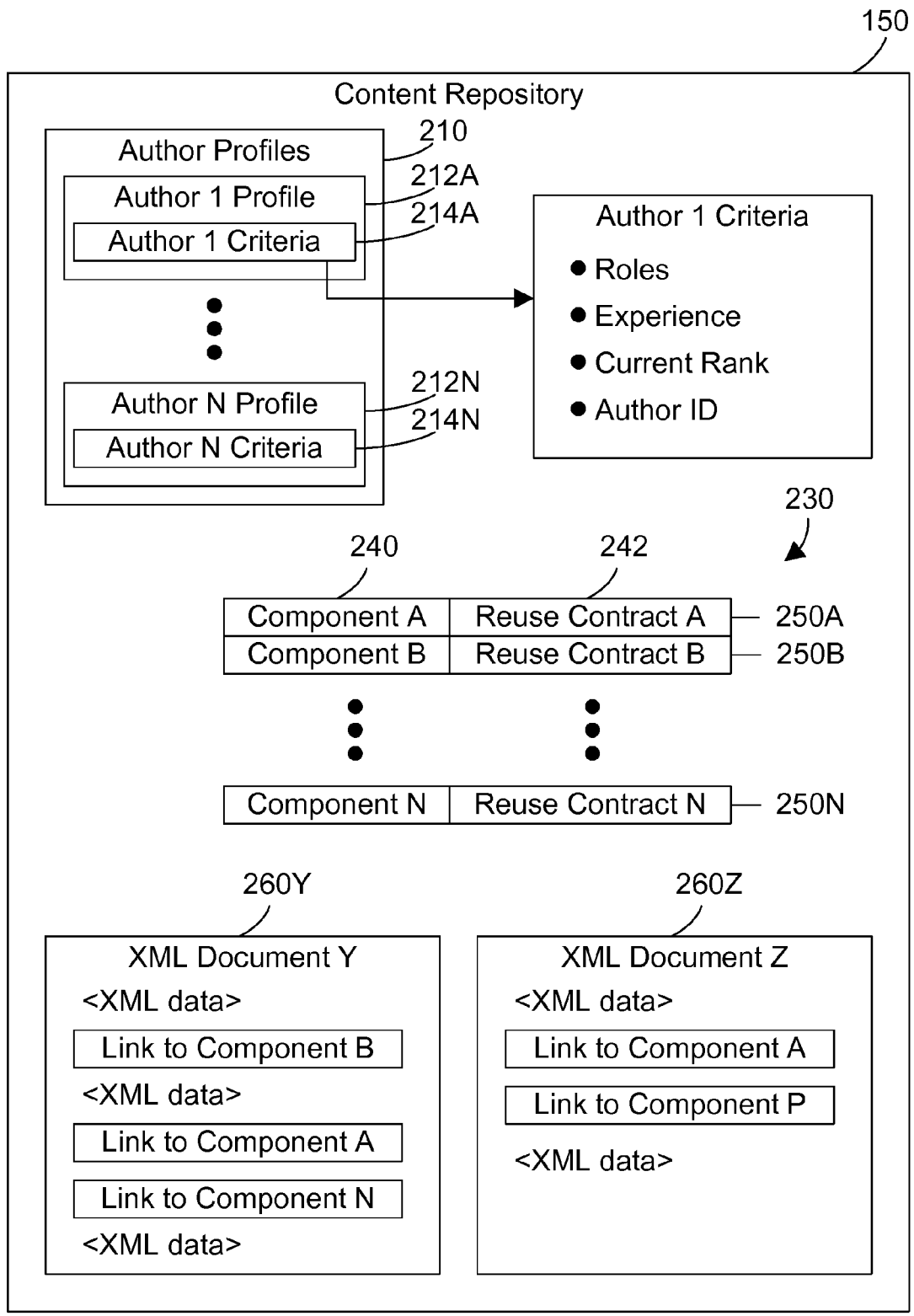
FIG. 2 is a block diagram showing details of the content repository 150 in FIG. 1.

Referring to FIG. 2, the content repository 150 in FIG. 1 is shown to include numerous items, including author profiles 210, a plurality of components 230, and documents 260Y and 260Z. Author profiles 210 include multiple profiles that each specify author criteria. Thus, author 1 profile 212A has a corresponding author criteria 214A, and possibly other author profiles through author profile N 212N with its corresponding criteria 214N. One suitable example for author criteria 214A in author profile 212A is shown in FIG. 2. For example, the author criteria may include the role(s) of the author, the experience of the author, the current rank of the author, and the author identifier (ID). The role of the author is preferably defined with respect to the author's role in the content management system. Thus, one user might be an author while another user might be a supervisor. While the author criteria in FIG. 2 are shown as separate and discrete items, one skilled in the art will recognize that a suitable heuristic could use multiple criteria. For example, an author authorization level could be computed from one or more of role, experience and current rank. The disclosure and claims herein expressly extend to any suitable author criteria in an author profile.

Figure 3:
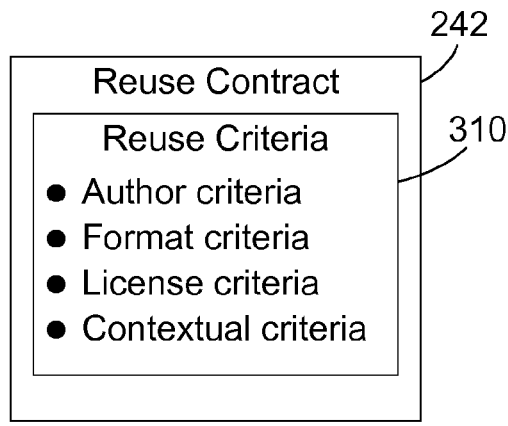
FIG. 3 is a block diagram showing sample reuse criteria that could be specified in a reuse contract.

Components 230 in FIG. 2 are shown to include a component portion 240 and a corresponding reuse contract 242. The component portion 240 includes the component itself. The reuse contract 242 specifies one or more reuse criteria 310 as shown in FIG. 3. The reuse criteria 310 may include any suitable criteria, including author criteria, format criteria, license criteria, and contextual criteria. Each of these are discussed in more detail below.

Components 230 in FIG. 2 are shown to include a first entry 250A, a second entry 250B, ..., to an Nth entry 250N. Also shown in FIG. 2 are extensible markup language (XML) documents 260Y and 260Z. Note that documents 260Y and 260Z are also components that are stored in the repository, but are compound components because they include links to other components in the repository. Thus, document 260Y includes a link to Component B, a link to Component A, and a link to Component N. Document 260Z includes a link to Component A and a link to Component P.

Figure 4:
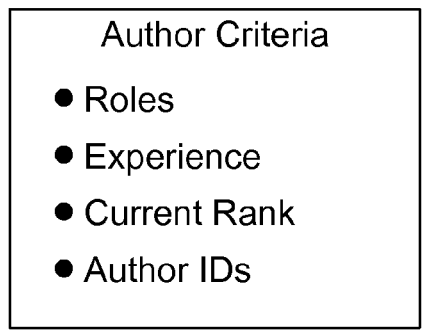
FIG. 4 is a block diagram showing sample author criteria that could be specified in a reuse contract.

Referring to FIG. 4, sample author criteria that could be specified in the reuse contract 242 in FIG. 3 include roles, experience, current rank, and author identifiers (IDs). Any or all of these may be specified to control which authors may reuse a component. For example, author criteria in a reuse contract could specify that only users with over a year's experience in the CMS and that also have a rank of 80 or more may reuse the component. As this simple example demonstrates, any suitable heuristic could be used to control reuse of a component to authors that satisfy the specified author criteria. Of course, other author criteria not shown in FIG. 4 could also be used within the scope of the disclosure and claims herein.

Figure 5:
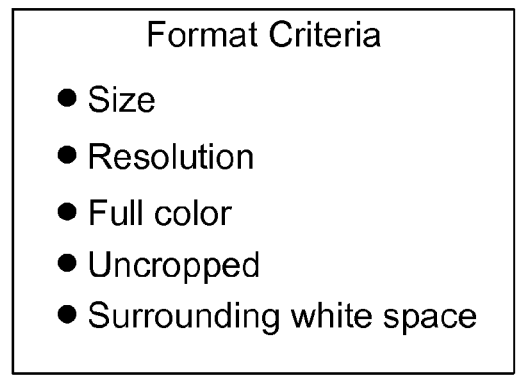
FIG. 5 is a block diagram showing sample format criteria that could be specified in a reuse contract.

FIG. 5 shows sample format criteria that could be specified in the reuse contract 242 in FIG. 3. The format criteria shown in FIG. 5 include size, resolution, full color, uncropped, and surrounding white space. The "size" criteria allow specifying a suitable minimum or maximum size for the content that must be satisfied for the component to be reused. For example, if the component is a detailed graphical chart, the author could specify a minimum size in order for the component to be reused in order to assure the details of the chart are legible. The "resolution" criteria allow specifying a suitable minimum or maximum resolution for content that must be satisfied for the component to be reused. For example, if the component is a photograph, the author could specify a minimum resolution for the component to be reused in order to assure the quality of the photograph is maintained. The "full color" criteria allow specifying that full color is or is not required for the component to be reused. For example, if the component is a color photograph with 256 colors, the author could specify the component must be in full color to be reused. The "uncropped" criteria allow specifying that a component may not be cropped when the component is reused. For example, if the component is a chart, the author could specify the component must be uncropped to be reused in order to assure all of the information in the chart is included. The "surrounding white space" criteria allow specifying a suitable minimum white space that must surround the component for the component to be reused. This allows the author to restrict the reuse of a component if the proposed reuse would crowd the component too much. Of course, other format criteria not shown in FIG. 5 could also be used within the scope of the disclosure and claims herein.

Figure 6:
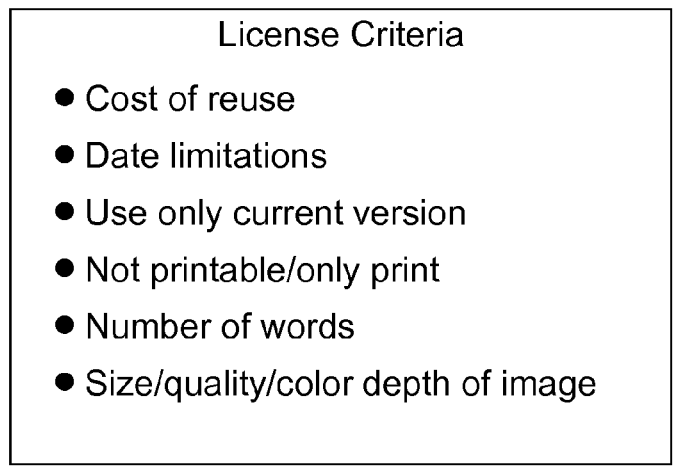
FIG. 6 is a block diagram showing sample license criteria that could be specified in a reuse contract.

FIG. 6 shows sample license criteria that could be specified in the reuse contract 242 in FIG. 3. The license criteria shown in FIG. 6 include cost of reuse, date limitations, use only current version, not printable/only print, number of words, and size/quality/color depth of image. The "cost of reuse" criteria allow specifying a suitable cost that must be paid for the component to be reused. Note the cost of reuse can be fixed, such as $10 per reuse, or may be variable, such as free for the first five uses, $5 per use for the next ten uses, $10 per use for the next ten uses, and so on. Thus, any suitable cost or heuristic could be specified in the "cost of reuse" criteria. When a cost of reuse is specified, the content reuse mechanism 172 in FIG. 1 preferably notifies the author that desires to reuse the component using the author feedback mechanism 174 to notify the author of the cost of the reuse. If the author approves, the "cost of reuse" criteria are satisfied, and the author is then charged the appropriate amount for the reuse.

The "date limitations" criteria allow specifying date conditions for the component to be reused. For example, if the component is a stock chart for a defined time period, the author could specify a maximum date for the component to be reused in order to assure the component is not used when it is too out-of-date. The "use only current version" criteria allow specifying that only the current version of the component may be reused, which disallows reuse of any prior versions of the component. The "not printable/only print" criteria allow specifying that a component may not be printable when the component is reused, or may only be printable (i.e., not displayed) when the component is reused. For example, two versions of a component could be used, one for display and the other for print, and the "not printable/only print" criteria could specify the version to be displayed is not printable, and the second version to be printed is only print and not displayed. The "number of words" criteria allow specifying a suitable minimum number of words that must accompany the component for the component to be reused. For example, if a detailed chart needs to be reused, the author could specify a minimum number of words of text that must accompany the reused component to assure the reused component is accompanied by an adequate explanation in text. The "size/quality/color depth of image" criteria allow specifying a minimum or maximum size, quality or color depth for a component. For example, if a component is an image, specifying a minimum or maximum size, quality or color depth helps the author assure the quality of the component is maintained when it is reused. Of course, other license criteria not shown in FIG. 6 could also be used within the scope of the disclosure and claims herein.

FIG. 7 shows sample contextual criteria that could be specified in the reuse contract 242 in FIG. 3. The contextual criteria shown in FIG. 7 include "always next to" and "never next to." The "always next to" criteria allow specifying suitable text, image, or advertising that must be in proximity to a component for the component to be reused. For example, if the cost of reuse of a component includes an agreement to display a banner advertisement when the component is displayed, the "always next to" criteria could specify the banner advertisement so the component can only be reused if the banner advertisement is included. The "never next to" criteria also allows specifying suitable text, image or advertising that must not be in proximity to a component for the component to be reused. For example, an author of a picture component could specify the picture is never next to text that includes profanity. In this manner the author has more control over the context where the component is reused. Of course, other contextual criteria not shown in FIG. 7 could also be used within the scope of the disclosure and claims herein.

Referring to FIG. 8, a method 800 shows suitable high-level functions of the content reuse mechanism 172 in FIG. 1. First an author requests to reuse a component in the repository (step 810). If the requested reuse satisfies the reuse contract for the component (step 820=YES), the author is allowed to reuse the component (step 830). If the requested reuse does not satisfy the reuse contract (step 820=NO), the reuse of the component is not allowed (step 840) and an error message is sent to the author (step 850) indicating the requested reuse is not allowed. Note the error message in step 850 is preferably sent using the author feedback mechanism 174 in FIG. 1. At this point, method 800 is done.

Figure 9:
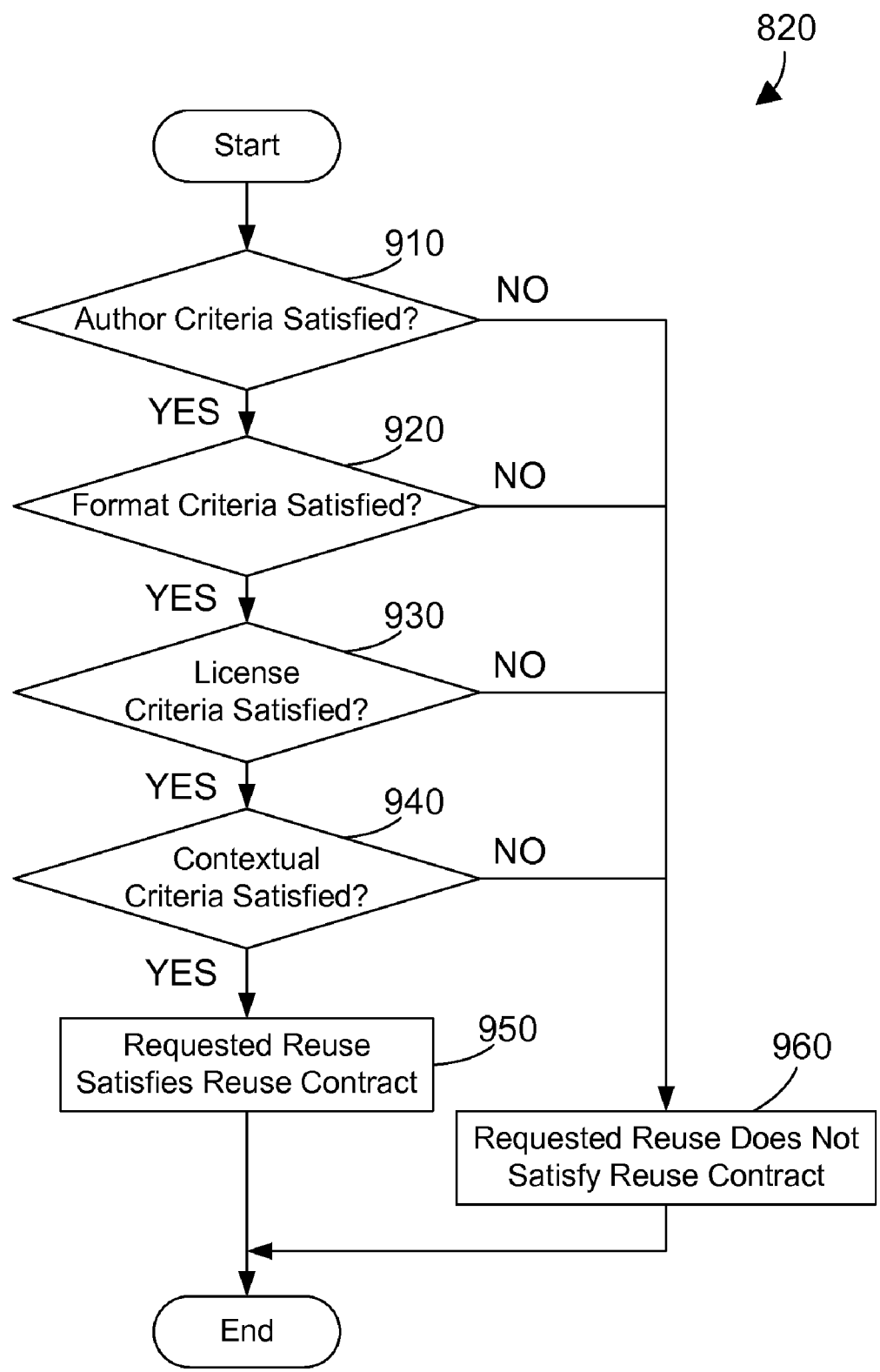
FIG. 9 is a flow diagram of one specific implementation for step 820 in FIG. 8.

Referring to FIG. 9, a method 820 is one suitable implementation for step 820 in FIG. 8. If the author criteria are satisfied (step 910=YES), and the format criteria are satisfied (step 920=YES), and the license criteria are satisfied (step 930=YES), and the contextual criteria are satisfied (step 940=YES), the requested reuse satisfies the reuse contract (step 950). If the author criteria are not satisfied (step 910=NO), or the format criteria are not satisfied (step 920=NO), or the license criteria are not satisfied (step 930=NO), or the contextual criteria are not satisfied (step 940=NO), the requested reuse does not satisfy the reuse contract (step 960). Note a reuse contract may not include all four criteria represented by steps 910, 920, 930 and 940 in FIG. 9. If one or more of these criteria are not specified in the reuse contract, we assume for the purposes of FIG. 9 that these criteria are satisfied.

Figure 10:
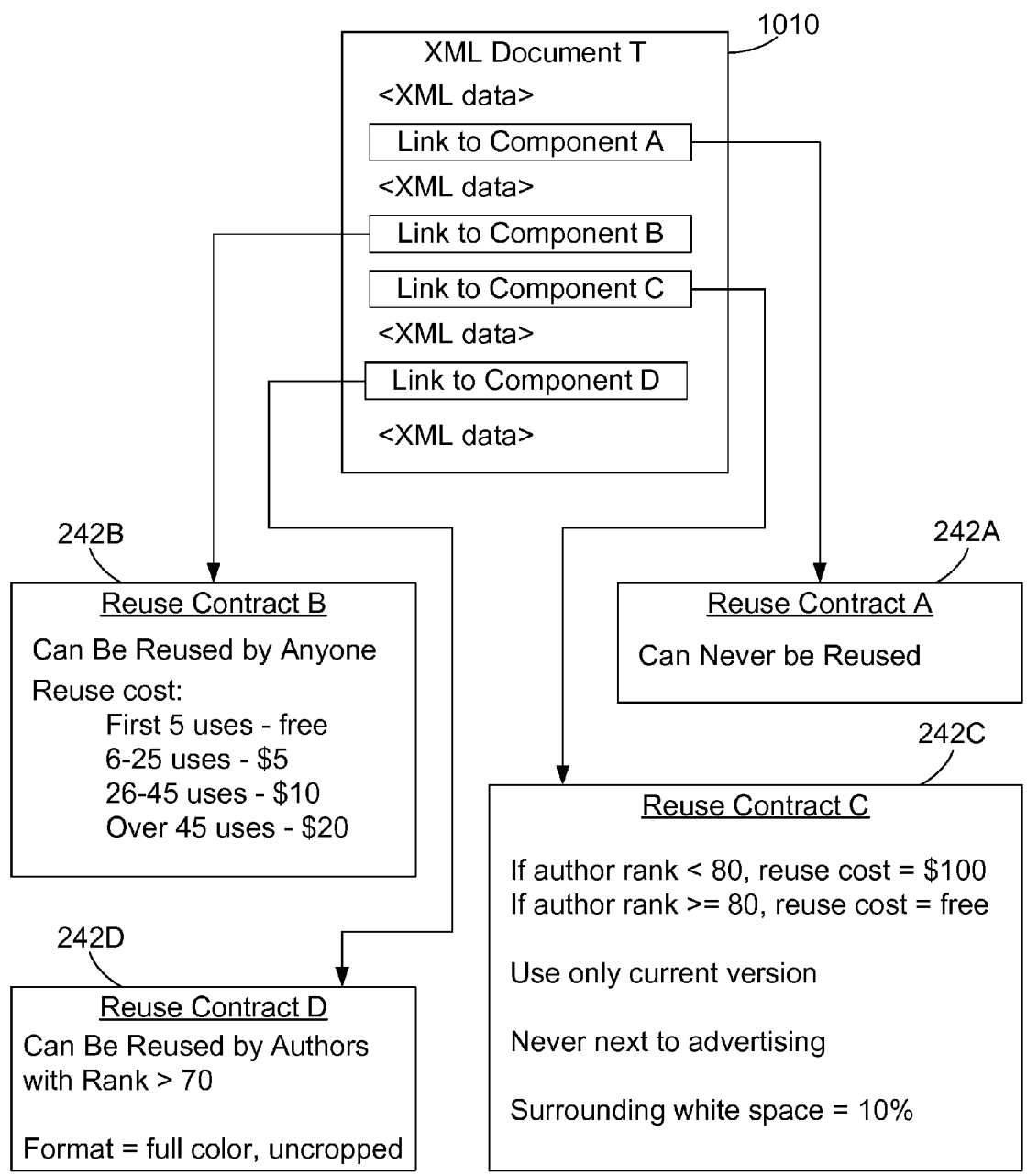
FIG. 10 is a block diagram of a sample document that includes links to four components with corresponding reuse contracts for each component for illustrating the concepts disclosed herein.

Referring to FIG. 10, an example is now shown to illustrate many of the concepts discussed herein. A compound document 1010 is shown to include links to four different components A, B, C and D. The reuse contracts for each of these components are shown in separate boxes connected to the component links with a line. Thus, the link to Component A is shown with a line to the reuse contract 242A for Component A. In similar fashion, each link to Components B, C and D in document 1010 has a line pointing to the corresponding reuse contracts 242B, 242C and 242D, respectively, for each of the components.

Reuse contract 242A indicates component A can never be reused. Reuse contract 242B indicates component B can be reused by any author, and the cost of reuse rises according to how many times the component has been reused. Reuse contract 242C indicates the reuse cost is $100 if the author rank is less than 80, but is free if the author rank is greater than or equal to 80. Reuse contract 242C also specifies to use only the current version, never next to advertising, and surrounding white space of 10%. Reuse contract 242D specifies component D can be reused by authors with a rank over 70, and further specifies the format must be full color and uncropped.

With the example shown in FIG. 10, we assume an author desiring to reuse components has an author profile that specifies a rank of 75. We then assume the selected author requests to reuse Component A. The reuse contract 242A is checked, which specifies Component A can never be reused. As a result, the requested reuse by the author is refused, and a message is sent to the author indicating the requested reuse of Component A was unsuccessful.

Now we assume the same author requests to reuse Component B. The reuse contract 242B is checked, which specifies Component B may be reused by anyone, with the reuse cost on a sliding scale depending on the number of uses. We assume for this example the use by this author is the ninth reuse of the component, which results in the content reuse mechanism notifying the author there will be a charge of $5 for reuse of the component. If the author approves this charge, the author will be allowed to reuse Component B, and the author will be charged $5 for the reuse.

Now we assume the same author requests to reuse Component C. The reuse contract 242C is checked, which specifies the reuse cost is $100 if the author rank is less than 80 and free if the author rank is greater than or equal to 80. Reuse contract 242C further specifies to use only the current version, never next to advertising, and surrounding white space of 10%. The author's rank is 75, which means the cost of this author reusing Component C is $100. The content reuse mechanism will use the author feedback mechanism to inform the author of the cost of reuse, and once the author approves the cost, the author is allowed to reuse the component and will be charged $100 for the reuse, assuming the other criteria in the reuse contract 242C are satisfied. We assume for this example Component C is the current version, that the author is not placing the component next to advertising, and there is surrounding white space greater than 10%. As a result, the author is allowed to reuse Component C once the author agrees to pay the $100 fee for reusing Component C.

Next we assume the same author requests to reuse Component D. The reuse contract 242D is checked, which specifies Component D may be reused by authors with a rank over 70, and further specifies the format must be full color and uncropped. Because the author's rank is 75, which is greater than 70, the user is allowed to reuse Component D provided the reuse is in full color and uncropped.

The simple example in FIG. 10 is presented to illustrate several of the concepts discussed and claimed herein, but is very simplified for the purpose of illustration. One skilled in the art will recognize that many different criteria not disclosed herein could be specified in a reuse contract for a component, allowing great flexibility and power in determining when and how a component is reused. For example, the cost of reuse for a component could be determined by the number of times content from the author of the component was reused, instead of the number of times a particular component was reused.

The content management system disclosed and claimed herein allows controlling reuse of content in a content management system using a reuse contract corresponding to a component to be changed. When an author's proposed reuse of a component satisfies a reuse contract corresponding to the component to be reused, the reuse is allowed. Otherwise, the reuse is not allowed and a message is sent to the author indicating the reuse was not allowed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the disclosure and claims herein expressly extend to content management systems that handle any suitable type of content, whether currently known or developed in the future.

What is claimed is:

1. An apparatus comprising:
   at least one processor;
   a memory coupled to the at least one processor;
   a repository residing in the memory that includes:
     a plurality of components; and
     a plurality of reuse contracts corresponding to the plurality of components, each reuse contract specifying at least one reuse criterion that determines whether a corresponding component may be reused, wherein the at least one reuse criterion includes at least one author criterion that must be satisfied for an author to reuse the corresponding component, wherein the at least one author criterion comprises role, experience and current rank, wherein the at least one reuse criterion further includes at least one format criterion that comprises size, resolution and surrounding white space, wherein the at least one reuse criterion further includes at least one license criterion that comprises cost of reuse and date limitations that specify a maximum date for reuse, wherein the at least one reuse criterion further includes at least one contextual criterion that specifies a spatial relationship with respect to text, image and advertising, wherein the at least one contextual criterion specifies when the corresponding component must be always next to text, when the corresponding component must be always next to image, when the corresponding component must be always next to advertising, when the corresponding component must be never next to text, when the corresponding component must be never next to image, and when the corresponding component must be never next to advertising;

a content management system residing in the memory and executed by the at least one processor, the content management system managing the plurality of components in the repository, the content management system comprising:

a content reuse mechanism that examines a requested reuse by a selected author of one of the plurality of components that includes a reuse contract and determines whether the at least one reuse criterion in the reuse contract allows the selected author to reuse the one component before allowing the selected author to reuse the one component.

2. The apparatus of claim 1 wherein the at least one author criterion further comprises author identifier.

3. The apparatus of claim 1 wherein the at least one format criterion further comprises: full color and uncropped.

4. The apparatus of claim 1 wherein the at least one license criterion further comprises: use only current version, not printable/only print, number of words, and size/quality/color depth of image.

5. A computer-implemented method for a content management system that manages a plurality of components in a repository to control reuse of the plurality of components, the method comprising the steps of:

(A) an author requesting to reuse a selected component in the repository, the selected component including a reuse contract specifying at least one reuse criterion that determines whether the selected component may be reused, wherein the at least one reuse criterion includes at least one author criterion that must be satisfied for an author to reuse the selected component, wherein the at least one author criterion comprises role, experience and current rank, wherein the at least one reuse criterion further includes at least one format criterion that comprises size, resolution and surrounding white space, wherein the at least one reuse criterion further includes at least one license criterion that comprises cost of reuse and date limitations that specify a maximum date for reuse, wherein the at least one reuse criterion further includes at least one contextual criterion that specifies a spatial relationship with respect to text, image and advertising, wherein the at least one contextual criterion specifies when the corresponding component must be always next to text, when the corresponding component must be always next to image, when the corresponding component must be always next to advertising, when the corresponding component must be never next to text, when the corresponding component must be never next to image, and when the corresponding component must be never next to advertising; and (B) examining the requested reuse of the selected component by a selected author and determining whether the at least one reuse criterion in the reuse contract allows the selected author to reuse the selected component before allowing the selected author to reuse the selected component.

6. The method of claim 5 wherein the at least one author criterion further comprises author identifier.

7. The method of claim 5 wherein the at least one format criterion further comprises: full color and uncropped.

8. The method of claim 5 wherein the at least one license criterion further comprises: use only current version, not printable/only print, number of words, and size/quality/color depth of image.

9. A computer-implemented method for a content management system that manages a plurality of components in a repository to control reuse of the plurality of components, the method comprising the steps of:

(A) storing in the repository a plurality of reuse contracts that each correspond to a component in the repository, each reuse contract including:

a. at least one author criterion comprising: role, experience, current rank, and author identifier;

b. at least one format criterion comprising: size, resolution, full color, uncropped, and surrounding white space;

c. at least one license criterion comprises: cost of reuse, date limitations that specify a maximum date for the component to be reused, use only current version, not printable/only print, number of words, and size/quality/color depth of image;

d. at least one contextual criterion that specifies a spatial relationship with respect to at least one component type, wherein the at least one component type comprises text, image and advertising, the at least one contextual criterion comprising: always next to text, always next to image, always next to advertising, never next to text, never next to image, and never next to advertising;

(B) storing a plurality of author profiles in the repository, each author profile specifying role, experience, current rank, and author identifier for a corresponding author;

(C) the author requesting to reuse a selected component in the repository;

(D) determining whether all criteria in the reuse contract are satisfied;

(E) if all criteria in the reuse contract are satisfied, allowing the author to reuse the selected component; and (F) if all criteria in the reuse contract are not satisfied, not allowing the author to reuse the selected component, and sending a message to the author indicating the reuse of the selected component was not allowed.

10. An article of manufacture comprising:

(A) a content management system that manages a plurality of documents in a repository, the content management system comprising:

1. a repository that includes:

a plurality of components; and a plurality of reuse contracts corresponding to the plurality of components, each reuse contract specifying at least one reuse criterion that determines whether a corresponding component may be reused, wherein the at least one reuse criterion includes at least one author criterion that must be satisfied for an author to reuse the corresponding component, wherein the at least one author criterion comprises role, experience and current rank, wherein the at least one reuse criterion further includes at least one format criterion that comprises size, resolution and surrounding white space, wherein the at least one reuse criterion further includes at least one license criterion that comprises cost of reuse and date limitations that specify a maximum date for reuse, wherein the at least one reuse criterion further includes at least one contextual criterion that specifies a spatial relationship with respect to text, image and advertising, wherein the at least one contextual criterion specifies when the corresponding component must be always next to text, when the corresponding component must be always next to image, when the corresponding component must be always next to advertising, when the corresponding component must be never next to text, when the corresponding component must be never next to image, and when the corresponding component must be never next to advertising;

2. a content reuse mechanism that examines a requested reuse by a selected author of one of the plurality of components that includes a reuse contract and determines whether the at least one reuse criterion in the reuse contract allows the selected author to reuse the one component before allowing the selected author to reuse the one component; and (B) computer-readable media bearing the content management system.

11. The article of manufacture of claim 10 wherein the at least one author criterion further comprises author identifier.

12. The article of manufacture of claim 10 wherein the at least one format criterion further comprises: full color and uncropped.

13. The article of manufacture of claim 10 wherein the at least one license criterion further comprises: use only current version, not printable/only print, number of words, and size/quality/color depth of image.

* * * * *